United States Patent [19]

DiFrank

[11] Patent Number: 4,729,811

[45] Date of Patent: Mar. 8, 1988

[54] INFEED GUIDE AND ROLL-ON BELT FOR BOTTLE LABELING MACHINE

[75] Inventor: Frank J. DiFrank, Toledo, Ohio

[73] Assignee: Owens-Illinois Glass Container Inc., Toledo, Ohio

[21] Appl. No.: 856,243

[22] Filed: Apr. 28, 1986

[51] Int. Cl.[4] .............................................. B32B 31/00

[52] U.S. Cl. .................................... 156/449; 156/456; 156/458; 198/842

[58] Field of Search ......................... 156/215, 447–450, 156/453, 455–458; 198/816, 824, 627, 628, 723, 836, 843, 441, 606, 842, 840; 29/125

[56] References Cited

U.S. PATENT DOCUMENTS

| | | | |
|---|---|---|---|
| 944,828 | 12/1909 | Spain | 156/447 |
| 2,862,638 | 12/1958 | Banks | 156/449 |
| 3,219,176 | 11/1965 | Kindig | 198/843 |
| 3,553,049 | 1/1971 | Wolff | 156/456 X |
| 3,707,417 | 12/1972 | Dollinger | 156/447 X |
| 3,952,861 | 4/1976 | Holmqvist et al. | 198/816 |
| 4,467,908 | 8/1984 | Schneider | 198/441 |
| 4,500,386 | 2/1985 | Hoffman | 156/449 |
| 4,574,020 | 3/1986 | Fosnaught | 156/215 X |

FOREIGN PATENT DOCUMENTS

| | | | |
|---|---|---|---|
| 770325 | 3/1957 | United Kingdom | 156/448 |
| 1190388 | 5/1970 | United Kingdom | 156/448 |

*Primary Examiner*—David Simmons

[57] ABSTRACT

Apparatus for applying labels to round glass containers by guiding the containers in succession to the surface of a rotating vacuum drum that supports the labels on its surface. The containers are carefully guided by a pair of vertically spaced starwheels and opposed guides with one starwheel and guide holding the body of the container while the other starwheel and guide holding the neck so that the side of the container that first engages the adhesive carrying leading edge of the label will be precisely vertical. The container and label are rolled by the drum along a primary backup pad and then engaged by a vertical, horizontally moving belt so as to roll along a secondary rollon pad. This assures a completely formed wrap-around label with an overlap seam that is consistently formed. The belt is guided at the end adjacent drum over a relatively small diameter of vertically stacked rollers on a vertical axle to provide smooth transition from the drum to the belt while the container is moved from the primary to the secondary rollon pads.

4 Claims, 5 Drawing Figures

INFEED GUIDE AND ROLL-ON BELT FOR BOTTLE LABELING MACHINE

BACKGROUND OF THE INVENTION

In the wrap-around labeling of bottles it has been a common practice to form heat shrinkable, plastic labels from a web of labels, into sleeves, by winding the label about a mandrel with overlapped edges of the label being heat sealed together. These sleeves are then assembled about the bottle and then passed through a heat shrink tunnel to cause the sleeve to shrink against the external surface of the bottle. In this way a bottle is provided with a thermoplastic sleeve label which may conform to the shoulder contour of the bottle and even be shrunk around the heel and beneath the bearing surface. Such a system is disclosed in U.S. Pat. No. 3,802,942.

A more recent U.S. Pat. No. 4,574,020, issued 3/4/86, discloses a process of applying labels to bottles in which a web of plastic label material is cut into label lengths and transported on the surface of a vacuum transfer drum. The vacuum drum is rotated about its vertical axis and has raised areas on its surface which underlie the leading and trailing edges of the cut labels. A gravure roll having a supply of solvent applied to its surface rotates about an axis parallel to the drum axis and is adapted to apply solvent to finite areas of the label at the trailing and leading edges. The label is then carried on the drum to a point where its leading edge meets the side wall of a bottle and becomes adhered thereto. The bottle is then rolled along the surface of the drum to wind the label thereabout until the trailing edge of the label overlaps the leading edge and sticks thereto to form a complete sleeve that is adhered to the bottle. The bottle with the label thereon is then passed through a heated tunnel to circumferentially shrink the sleeve label into relatively tight conformity with the external configuration of the bottle.

In this process set forth above, it is important that the bottle axis be vertical when the leading edge of the label is first stuck to the side of the bottle so that, upon complete wrapping of the label about the bottle, the leading edge and trailing edges will be in exact horizontal alignment. Otherwise, if the labels are not in precise alignment, a "mismatch" occurs and the subsequent shrinkage may result in an unsightly label. Unless the axis of the bottle is held vertical, at the time the label first touches the sidewall thereof, the resultant rolling of the label on the bottle will leave the trailing edge of the label at an angle and it will not line up with the underlying leading edge.

Another important consideration to handling the bottles through the label applicating system of the invention is the movement of the labeled bottle through what is termed a "secondary roll-on section" where the bottle is rolled with its sidewall in contact with an elongated resilient pad to assure that the overlap of the trailing edge is over the leading edge firmly pressed together. This application of pressure to the overlap seam is carried out by rolling the bottle over a polyurethane pad whose vertical shape parallels the shape or vertical contour of the generally round bottle. The bottle is, in effect, gripped between the vacuum drum and a primary pad for the initial application of the label and then is passed to a secondary roll-on pad while being moved by a horizontally moving belt that has a vertical surface in parallel to the secondary pad.

It is thus an object of the present invention to apply a label to a container or bottle where the bottle serves as a mandrel upon which the label is wound into a full overlapping sleeve that is adhered to itself with the top and bottom edges of the labels being in registry at the overlap seam and then engaging the seam with a pressing pad to assure the formation of a complete vertical seam.

Other objects will be apparent from the following description taken in conjunction with the annexed sheets of drawings.

DETAILED DESCRIPTION OF THE DRAWINGS

Figure 1:
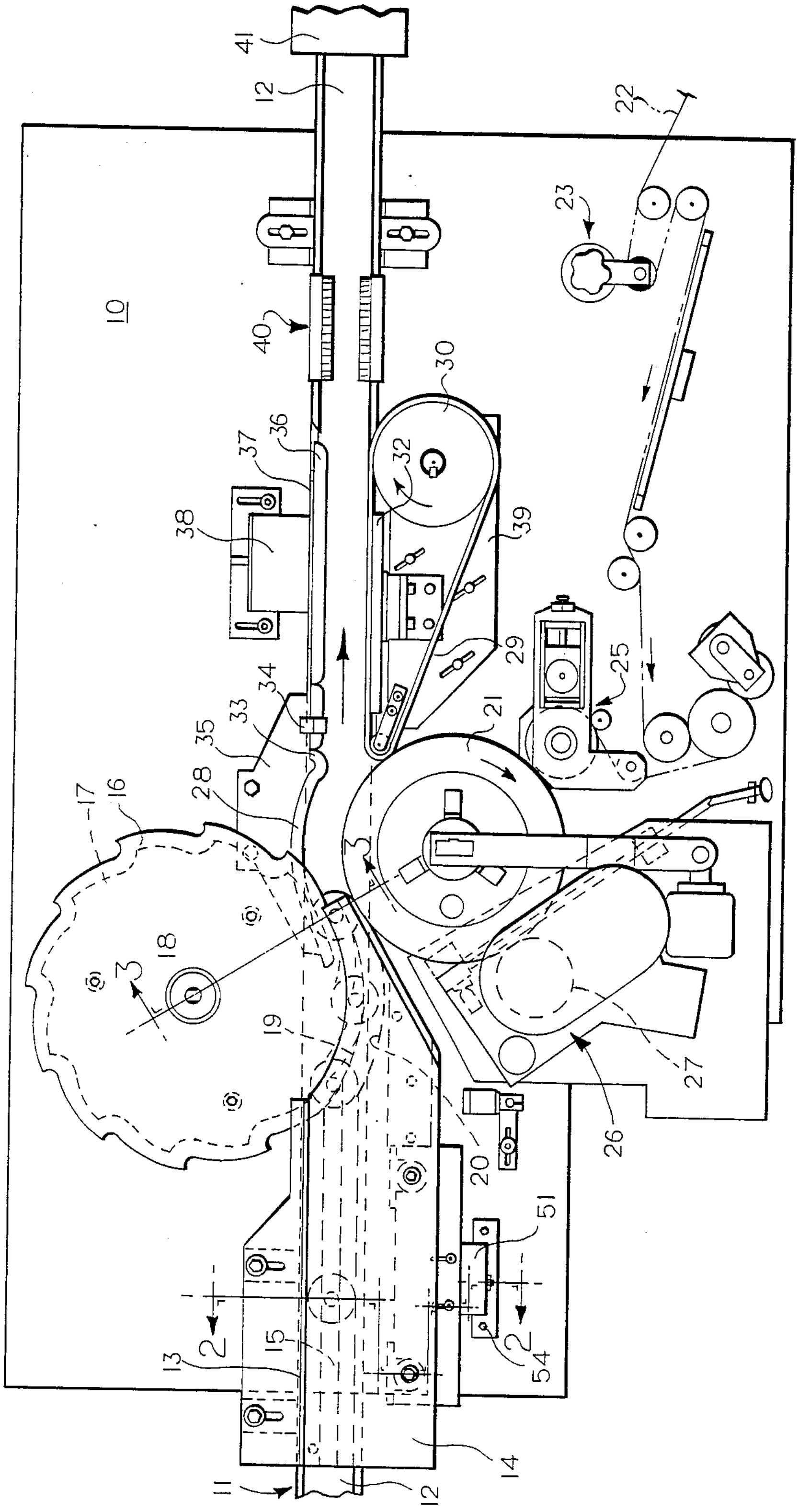
FIG. 1 is a plan view of a bottle labeling system incorporating the infeed guide and secondary roll-on belt of the invention.

With particular reference to FIG. 1, the following is a general description of the operation of the overall labeling system. A horizontal supporting table 10 of generally rectangular configuration serves to support the mechanisms and is itself supported above the floor by a plurality of vertical legs (not shown). Mounted above the table and extending generally across the length of the table is a conveyor generally designated 11. The conveyor 11 has a horizontally moving upper surface 12 which is driven in the direction of the arrow shown thereon. Containers or bottles B to be labeled are supplied at the left hand end of the conveyor 11 in an upright attitude on the surface 12 of the conveyor. With the conveyor surface 12 moving in the direction of the arrow thereon, the bottles will be carried from the left to the right as viewed in FIG. 1. The bottles are guided by rails 13 which extend along either side of the conveyor 12. An overhead member 14 is shown which is provided in its under surface with a guiding slot 15 within which the finish or neck of the bottles will be guided. As can be seen when viewing FIG. 1, the bottles moving from the left approach a pair of vertically spaced, pocketed starwheels 16 and 17 which are both mounted to a vertical axle 18 which is rotated in a counterclockwise direction as viewed in FIG. 1. The starwheel 16 has 12 pockets circumferentially spaced about the circumference thereof which pockets are adapted to engage the neck of the bottles being handled and the starwheel 17 is provided with a like number of pockets that are of somewhat larger dimension and are adapted to engage the sidewall of the bottles being handled.

An arcuate guide 19 has a contour which is coaxial with respect to the axle 18 and serves to hold the necks of the bottles at a precise distance from the axle 18 of the starwheel 16. In addition, there is a lower arcuate guide 20 which is mounted at a height generally the same as the height of the sidewall or body engaging starwheel 17 to maintain the bottles B with their axes vertical during the movement of the bottles by the starwheels 16 and 17. when a bottle reaches the position generally designated P, the side of the bottle B will approach, generally tangentially, the circumferential periphery of a vacuum drum 21. The vacuum drum 21 is a generally cylindrical member having a height somewhat greater than the height of a label which is to be applied to the bottles B. The drum 21 will have a plurality of vacuum passages opening through the surface thereof to, in effect, grip the individual labels supplied thereto and to convey the labels to the position P. The labels may be formed from a web 22 of foam-film polystyrene which may be pre-printed and which will be coming from a supply (not shown) at the right through a tension takeup device 23. After passing the tension compensating device 23 the web 22 will pass around a driven feed roller 24 and then to a label cutting and handling system generally designated 25. The label cutting device 25 cuts the label at a predetermined point in its length with the leading edge of the label being brought into peripheral engagement with the drum 21. The label will adhere to the outer surface of the drum 21 and move in the direction of the arrow on the drum 21 to carry the label past a glue or solvent applying station 26 where a glue roll or solvent transfer gravure roll 27 will apply the glue or solvent to selected, defined areas of the label. The gravure roll 27 is driven by a mechanism (not shown) generally in a counterclockwise direction, as viewed in FIG. 1, and timed to present the solvent to the leading and trailing edges of the label which is transported by the vacuum drum 21.

At the point P the leading edge of the label will engage the sidewall of the bottle B and the leading edge of the label will become adhered to the bottle. From this point on, the bottle will be held against the surface of the drum by a primary backup pad 28 which is mounted to the surface of the table 10 by a bracket 35. The backup pad 28 may be formed of a resilient foam material such as foam rubber so that it will effectively hold the bottle B against the surface of the drum and as the drum continues to rotate the bottle will be effectively rolled along the surface of the label carried on the surface of the vacuum drum 21.

As previously described, the label carried by the drum 21 will have a vertical, full height, line of solvent applied to the trailing edge thereof and the trailing edge of the label will overlap the leading edge and adhere thereto to form an overlap seam. The container with the label applied continues to be guided by the primary backup pad 28 until it reaches a secondary roll-on belt 29. The secondary roll-on belt 29 passes about a drive roll 30 which is driven in the direction of the arrow shown thereon. The belt 29 also passes about a relatively small diameter inlet roll 31. A stationary, vertical backup surface 32 maintains the belt 29 in a fairly straight path between the drive roll 30 and the inlet roll 31. The bottle B will have the label completely wrapped thereabout prior to the movement of the bottle into engagement with the secondary roll-on belt 29. The primary backup pad 28 has an area 33 which tends to maintain the bottle in contact with the vacuum drum 21 until such time as the bottle engages the secondary roll-on belt 29. This provides a positive drive for the bottle so that when the bottle passes to the secondary roll-on belt, it will be rotated while moved along by the moving surface of the belt 29. The moving belt drives the rolling bottle so that the overlap seam of the label will contact a resilient pressing pad 34 which is mounted beyond the primary pad 28 on a bracket 35 which in turn is mounted to the table 10 as previously described.

A secondary backup pad is positioned in bottle engaging, diametrically opposed, position relative to the secondary roll-on belt 29. The pad 36 is also formed with a foam rubber or like resilient member mounted to a plate 37 which in turn is mounted by bracket 38 to the top of the table 10.

It perhaps should be pointed out also that the secondary roll-on belt 29 and its drive roll 30 and inlet roll 31 are both mounted on a mounting plate 39 which may be moved relative to the upper surface of the table 10, and thus be adjusted toward or away from the center line of the conveyor 12 to accommodate the mechanism for different size bottles. Likewise, the secondary backup pad 36 and the bracket 38 which supports it may be moved toward or away from the center line of the conveyor 12.

As can be seen when viewing FIG. 1, the bottles B, after passing between the secondary backup pad and the secondary roll-on belt, will be held back by the brush spacer, generally designated 40, and that the bottles are moved through the brush spacer 40 in surface-to-surface contact under the force created by the moving belt 29, until such time as the leading bottle clears the spacer 40, at which time the bottle is free to move at the speed of the conveyor 12 into a heat shrink oven 41. The bottles will leave the brush spacer at regular intervals depending upon the speed with which the label wrap machine is operating. It should be understood that the drum 21 and drive roll 30 are commonly driven.

Figure 2:
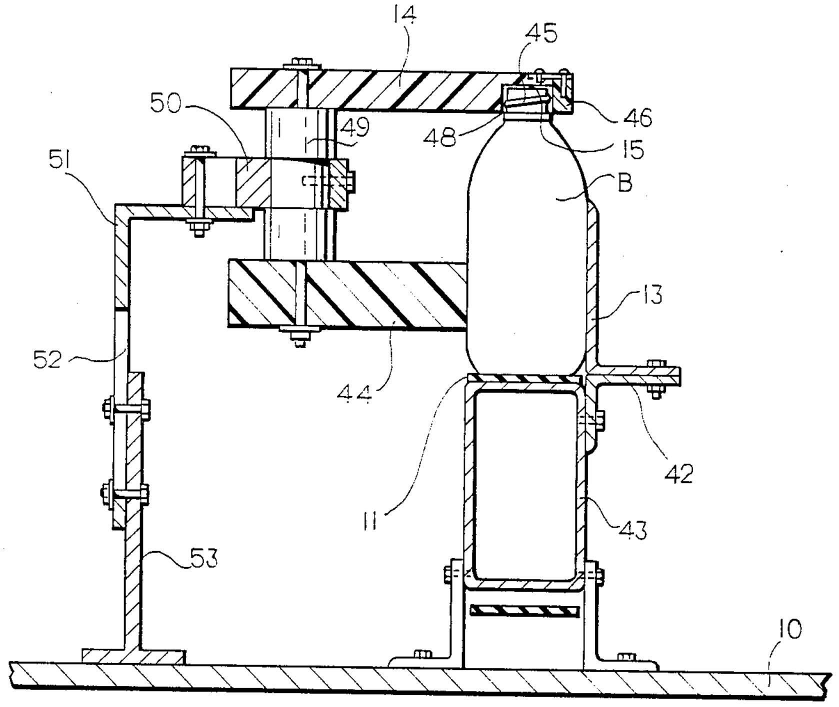
FIG. 2 is a cross-sectional view, on an enlarged scale, taken at line 2—2 of FIG. 1.
Figure 3:
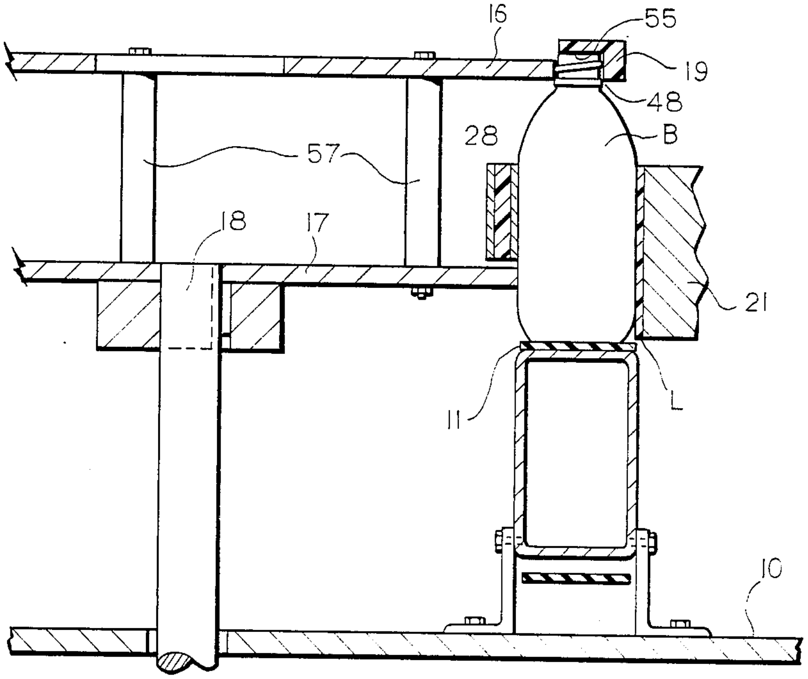
FIG. 3 is a cross-sectional view taken at line 3—3 of FIG. 1, on an enlarged scale.

Turning specifically to FIGS. 2 and 3, the guiding of the bottles B into the labeling machine can be described in terms of the bottles arriving on the conveyor 11 from the left guided on the one side by the rail 13 in the form of a vertical wall mounted to an angle bracket 42 which is bolted to the side of the conveyor support in the form of a hollow, rectangular beam 43. In opposing relationship to the rail 13 is a wear resistant bar 44 formed of a material such as nylon which will not scratch the bottles. The bar 44 extends along the one side of the conveyor and maintains the bottle with its axis generally vertical.

Spaced vertically above the bar 44 is the generally horizontal, overhead bar 14. The bar 14 serves to accurately guide the neck or finish 45 of the bottles. As can be seen in FIG. 2, the guide 14 is formed with a horizontal notch or slot 15 along one surface edge within which the finish 45 will ride. The bottle finish is held in this notch 15 by a retaining bar 46 which extends along the outer edge of the member 14 and is mounted thereto by a strap 47 which is tacked or screwed to both the member 14 and bar 46.

It should be noted that the container illustrated is a typical narrow-necked bottle which is formed with a transfer bead 48 that forms a radially extending collar around the container. The member 14 and bar 46 will have their bottom edges positioned to engage the top of the transfer bead 48 and hold the bottle down on the conveyor in the event it trys to move vertically during its movement in the guide 14.

The bar 44 and the guide 14 are shown mounted to opposite ends of a vertical, cylindrical member 49. The member 49 has an undercut area intermediate its length which serves to hold and retain a clamp bracket 50 which in turn is mounted on an elongated angle bracket 51. The bracket 51 has a vertically extending portion which has vertical adjusting slots 52 therein. The bracket 51 bolts to a vertical web 53 of member that is bolted at 54 (FIG. 1) to the support table 10. Thus it can be seen that the bottle is accurately guided toward the starwheels 16 and 17 where the starwheel 17 will engage the lower sidewall of the bottle and move it in an arc about the axis 18 of the starwheel. The body guide 20 will be engaging the opposite sidewall area of the bottle.

At the same time, the finish 45 of the bottle will be held within a right angle notch 55 formed in the underside of the arcuate neck guide 19. The guide 19 actually is formed in the top guide 14 as a part thereof. The lower edge 56 of the guide 19 is adapted to engage the transfer bead 48 on the bottle since the neck of the bottle is held within the notch 55 by the starwheel 16 as shown in FIG. 3. The two starwheels are actually connected together by vertical posts 57. The shaft 18 is driven by means (not shown) and will turn the starwheels to which they are mounted.

The specific position, where the section line 3—3 is taken on FIG. 1, is the point or position "P" where the leading edge of the label is first contacted with the bottle. It is at this point that the axis of the bottle must be held vertical so that the sidewall which is brought into contact with the label will be essentially vertical. When the label adheres to the bottle sidewall, the bottle serves, in effect, as a mandrel about which the label is wrapped. If the label is not precisely applied at the leading edge to the bottle sidewall, subsequent wrapping of the label about the bottle would result in the trailing edge overlapping the leading edge out of alignment. The leading edge of the label must be vertical and the sidewall also must be vertical.

Since the bottle is being guided from its side by the arcuate surface of the guide 20 and the neck is accurately held by the guide 19 with the starwheels engaging the bottle, the ability to have an accurate vertical attitude to the bottle is assured. This is in contrast to the prior systems which guided the bottles only by sidewall engagement without specifically providing a guide for the neck. The distance between the points where the body is guided and the neck is guided gives this assurance.

After the label has been adhered at its leading edge to the bottle and rolled along the surface of the drum 21 to the extent necessary to fully wrap the label about the bottle, the trailing edge which carries a full height line of adhesive or solvent will overlap and become joined to the leading edge to form a vertical seam.

As illustrated in FIG. 3, the label height is such that it extends from about a sixteenth of an inch from conveyor surface on which the bottle rests to slightly above the point where the generally, cylindrical sidewall curves inwardly to form the shoulder of the bottle. The wraparound of the label and the fact that the overlap seam will be compressed by the bottle being held against the drum surface by the primary backup pad. However, the drum surface is fairly rigid being made of a rubber cover that has raised pads underlying the leading and trailing edges of the label to insure transfer of the solvent thereto, but the upper and lower portions of the seam will not be compressed because of the bottle contour. Thus, to insure the compressing of the seam to its full extent the bottle with the label is rolled along the drum into contact with the moving belt 29 at which time the moving belt takes over and rolls the bottle against the vertical urethane pad 34 which will be of a height at least equal to the label height and engage the seam throughout its full height.

Figure 4:
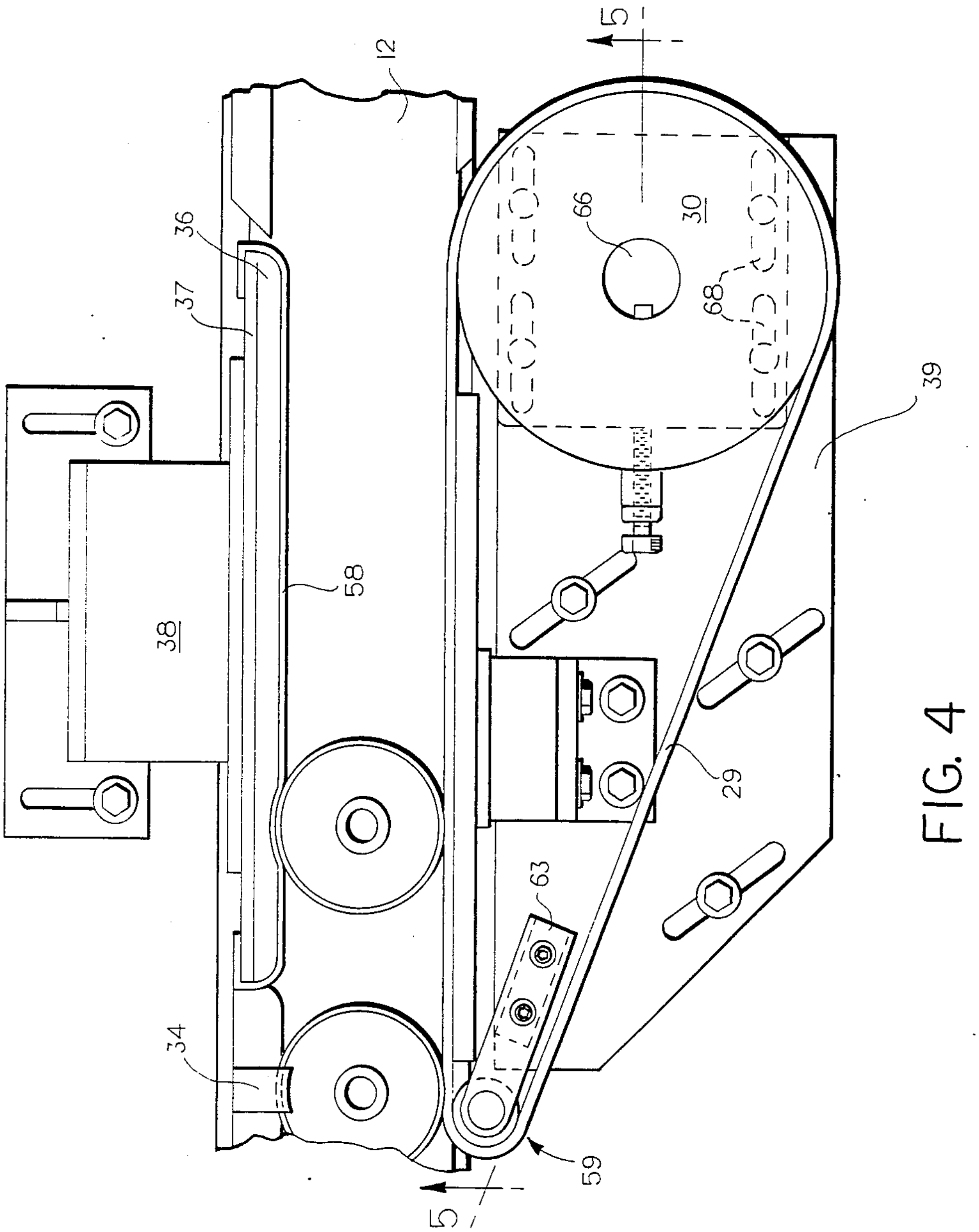
FIG. 4 is a plan view of the secondary roll-on belt drive section, on an enlarged scale; and, FIG. 5 is an elevational view of the roll-on belt drive of FIG. 4.
Figure 5:
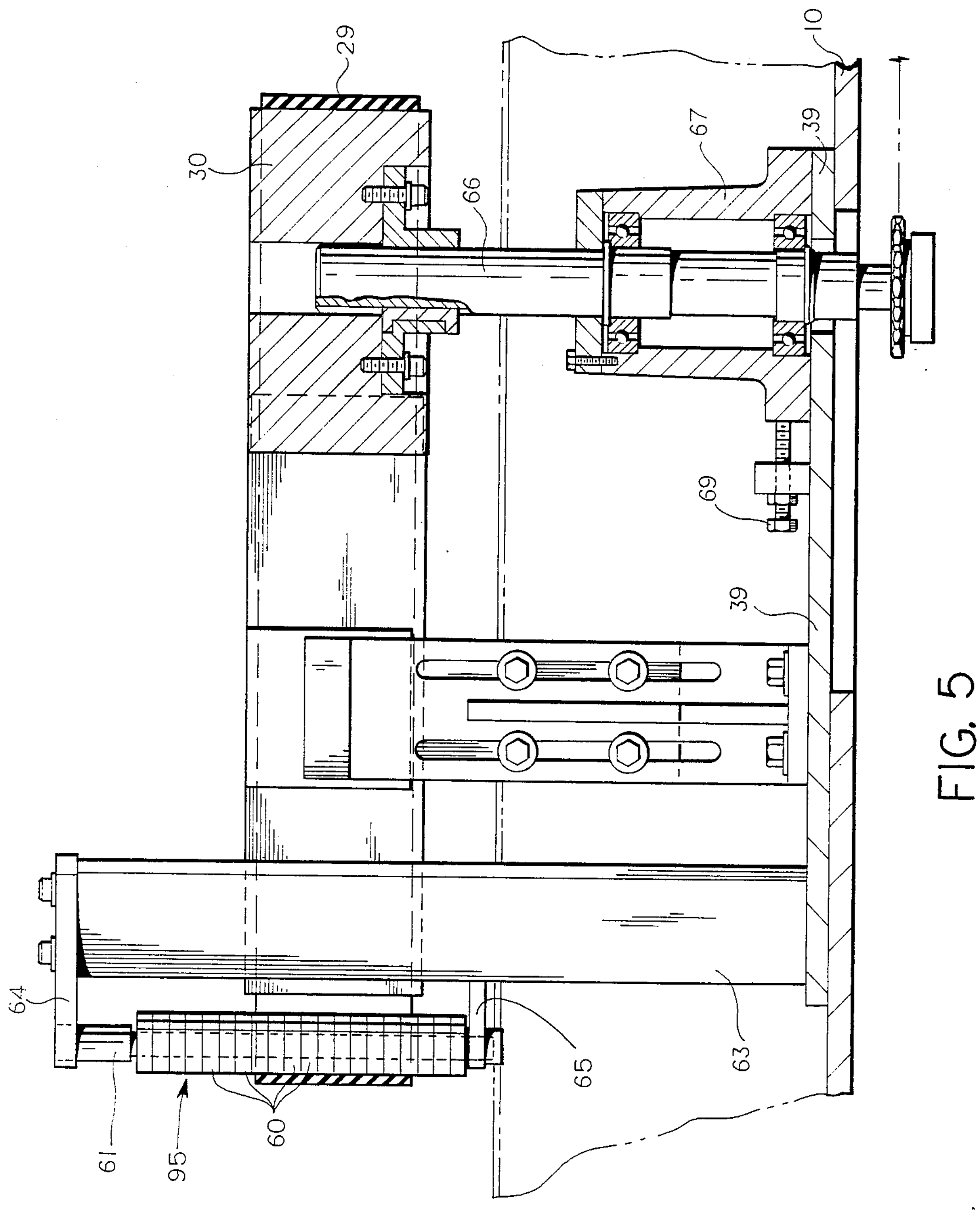

As best shown in FIGS. 4 and 5, the secondary roll-on pad 36 has rubber belting cover 58 over the sponge pad 36 which in turn is supported by the plate 37. In opposing relationship to the roll-on pad 36 is the secondary roll-on belt 29. At the left end, as viewed in the drawings, where the bottle first contacts the belt 29, the belt is guided by roller 59. The roller 59 is relatively small in cross-section and is made up of a plurality of small rollers 60 which are supported on a vertical spindle 61 for rotation relative thereto. The use of plural rollers is significant in that they do not distort the rolling contact with the bottle so the belt does not slip and the initial contact with the belt does not alter the orientation of the seam so that it will be compressed by the contoured pad 34. The belt 29 is backed, along its full length, by the plate 32 which is mounted to the plate 39 by a bracket 62. As best seen in FIG. 5, the spindle 61 is supported by a vertical beam 63 with a pair of horizontal arms 64 and 65. The drive roll 30 is mounted on a vertical shaft 66 that is supported from the plate 39 by bearing housing 67. The housing 67 is adjustable in the direction of slots 68 in the base thereof and the tension in the belt 29 may be maintained by use of an adjusting screw 69 which is in contact with the side of the base of the housing. With the roller system 61 employed for the secondary roll-on belt, the height of the belt may be changed without requiring a change in the forward roller support system. It is understood that the seam of the label will be compressed several times by the processing movement of the bottles through the gap between the belt 29 and the pad 36.

While the foregoing sets forth the best mode contemplated for carrying out the invention, obvious modifications may be resorted to without departing from the spirit and scope of the invention as set forth in the appended claims.

What is claimed:

1. In apparatus for applying wrap-around labels to cylindrical glass containers where the side wall of the container is guided into engagement with the leading edge of a label that is being transported on the surface of a rotating cylindrical vacuum drum with the leading edge of the label becoming adhered to the container wall and the container is held against the drum surface by a resilient, curved, primary backup pad so the label will be rolled around the container until its trailing edge overlaps the leading edge and becomes adhered thereto and the container is rolled along the vertical of a horizontal secondary backup pad by being held thereagainst by a linearly moving belt, the improvement in the system comprising a vertical axle for supporting a vertical series of rollers thereon, each roller being free to rotate relative to each other and said axle, a wide endless belt extending about said rollers, a driving roll mounted on a vertical shaft, said shaft being spaced from said axle, said belt extending about said drive roll, means connected to said shaft for rotating said shaft to move said endless belt between said drive roll and said vertical series of rollers, a stationary vertical surface extending between said drive roll and rollers against which the surface of said belt is moved, said vertical surface being parallel to said secondary rollup pad whereby containers will be biased between said moving belt and backup pad to assure that the overlap of the label will produce a complete, secure seam in the label, said rollers being a fairly small diameter so that the gap between the vacuum drum and the driven belt is held to a minimum.

2. The apparatus of claim 1 wherein said axle for supporting said rollers is mounted on a horizontal mounting plate and said backing plate is also mounted on said mounting plate.

3. The apparatus of claim 2 further including means for adjusting said mounting plate toward and away from the vertical plane of said secondary backup pad to accommodate containers of different diameters.

4. The apparatus of claim 2 wherein said backing plate is adjustably mounted to said mounting plate by a pair of angle brackets formed with overlapping vertical members that are bolted together to provide height adjustment to said backup plate.

* * * * *